United States Patent
Ens et al.

(10) Patent No.: US 6,976,503 B2
(45) Date of Patent: Dec. 20, 2005

(54) DIAGNOSTIC SYSTEM AND METHOD FOR A VALVE

(75) Inventors: Wolfgang Ens, Linkenheim (DE); Alf Puettmer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/972,581

(22) Filed: Oct. 26, 2004

(65) Prior Publication Data

US 2005/0126639 A1    Jun. 16, 2005

Related U.S. Application Data

(63) Continuation of application No. PCT/DE03/01312, filed on Apr. 22, 2003.

(30) Foreign Application Priority Data

Apr. 26, 2002 (DE) .............................. 102 18 830

(51) Int. Cl.$^7$ ............................................ F16K 37/00
(52) U.S. Cl. ..................... 137/552; 73/40.5 A; 73/168; 73/592
(58) Field of Search ............................. 137/551, 552, 137/554; 73/1.72, 1.82, 40.5 A, 168, 592; 251/129.04

(56) References Cited

U.S. PATENT DOCUMENTS

| | | | |
|---|---|---|---|
| 4,758,964 A | | 7/1988 | Bittner et al. |
| 4,821,769 A | * | 4/1989 | Mills et al. ................. 137/554 |
| 4,896,101 A | | 1/1990 | Cobb |
| 5,616,824 A | * | 4/1997 | Abdel-Malek et al. ........ 73/168 |
| 5,616,829 A | * | 4/1997 | Balaschak et al. ....... 73/40.5 R |
| 6,128,946 A | * | 10/2000 | Leon et al. .............. 73/40.5 A |
| 6,134,949 A | * | 10/2000 | Leon et al. .............. 73/40.5 A |
| 6,289,723 B1 | * | 9/2001 | Leon ........................... 73/592 |
| 6,530,277 B2 | * | 3/2003 | Kumpfmueller ............. 73/592 |
| 6,637,267 B2 | * | 10/2003 | Fiebelkorn et al. ........... 73/592 |

FOREIGN PATENT DOCUMENTS

| | | |
|---|---|---|
| DE | 199 24 377 A1 | 12/2000 |
| DE | 199 47 129 A1 | 4/2001 |
| EP | 0 637 713 A1 | 2/1995 EP |
| 1 134 571 | A2 | 9/2001 |

* cited by examiner

Ulrich Klein, "Schwingungsdiagnostische Beurteilung Von Maschinen und Anlagen", [Vibration Diagnostic Evaluation of Machines and Equipment], Aug. 2000, Verlag Stahleisen GmbH, Duesseldorf, Germany, pp. 25-50.

(Continued)

Primary Examiner—John Rivell
(74) Attorney, Agent, or Firm—Sughrue Mion, PLLC

(57) ABSTRACT

A diagnostic system, for a valve (2), having a sensor (12) that senses structure-borne noise and having a device (14) for evaluating a measurement signal (13) of the structure-borne noise. During a calibration process, a first progression of the measurement signal is sensed for the closed position of the valve (2) and a first value (w1) of a characteristic is determined. To simulate leakage noise, the valve (2) is nearly closed during operation, a second progression of the measurement signal is sensed and a second value (w2) is determined. If the deviation of the second value from the first value is sufficiently large, a diagnosis is possible. A third progression of the measurement signal is sensed for the closed position of the valve as in an installed condition, and a third value (w3) is determined. If the deviation of the third value (w3) from the first value (w1) is too great, and if a diagnosis has been identified as being possible, then the system deduces that the valve leaks.

14 Claims, 2 Drawing Sheets

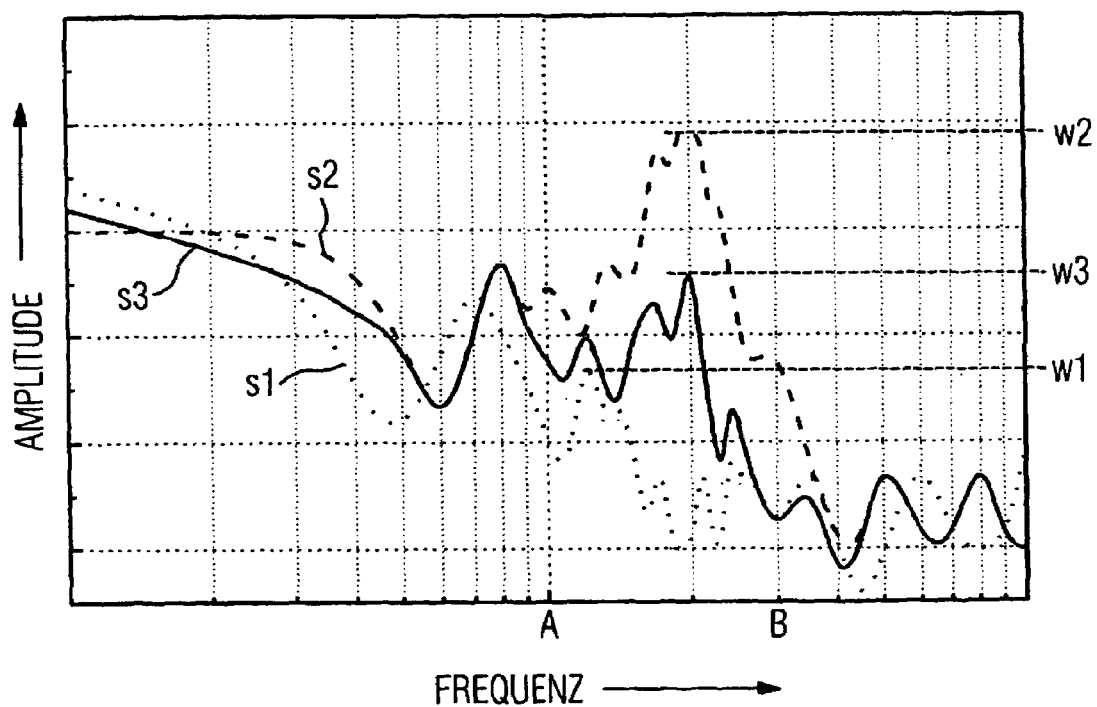

DIAGNOSTIC SYSTEM AND METHOD FOR A VALVE

This is a Continuation of International Application PCT/DE03/01312, with an international filing date of Apr. 22, 2003, which was published under PCT Article 21(2) in German, and the disclosure of which is incorporated into this application by reference.

FIELD AND BACKGROUND OF THE INVENTION

The invention relates to a diagnostic system for a valve that can be actuated by a drive by way of a positioner and that has a sensor for detecting structure borne noise, wherein the diagnostic system determines whether diagnosis is possible and, if so, whether the valve leaks. The invention also relates to a diagnostic method, wherein the diagnostic method determines whether diagnosis of the valve is possible and, if so, whether the valve leaks.

In many areas of process engineering and power engineering, the trouble-free operation of a plant depends on the flawless functioning of the control and check valves used. To avoid costly irregular operational interruptions, any valve damage should, if at all possible, be detected early, i.e., before a valve failure can cause the plant to be shut down. Defective valve seats, for example, cause leakage flows that emit broadband noise. Detecting and evaluating the noise emission of a valve can thus be used for early detection of valve damage. Since valve faults can lead to damage and expensive follow-up costs, a diagnosis, possibly with automatic detection and programmable evaluation of the faults, is highly useful. Statistical evaluations of the diagnostic data can be used to optimize the maintenance processes to ensure a timely replacement of a faulty valve, and to qualitatively evaluate and classify the valve manufacturers, or to evaluate the suitability of specific valves for different process types.

German Laid Open Publication DE 199 24 377 A1 discloses a diagnostic system for a valve that can be actuated by a positioner using a drive. This system has a device for recording, storing and evaluating structure-borne noise spectra measured on the valve. To enable a particularly reliable valve diagnosis, the structure-borne noise spectra measured for a slightly open intact valve can be stored in the recording, storing and evaluating device. For the diagnosis, a structure-borne noise spectrum measured for the closed valve is compared with the stored spectrum, and the similarity of the spectra is used to determine whether the valve leaks.

A further diagnostic system for a valve is known from German Laid Open Publication DE 199 47 129 A1.

OBJECTS OF THE INVENTION

An object of the invention is to provide a diagnostic system and a diagnostic method, which have an improved reliability of the diagnostic result.

SUMMARY OF THE INVENTION

To attain the above and other objects, the novel diagnostic system is applied to a valve that can be actuated by a positioner by way of a drive, wherein the valve has a sensor for detecting structure-borne noise, the diagnostic system includes:

a measurement signal evaluating device that receives from the sensor a measurement signal of the structure-borne noise, wherein the measurement signal evaluating device comprises an arithmetic logic unit that:

determines a first value of a characteristic during a calibration process, wherein the first value is determined based on a first progression of the measurement signal recorded when the valve is in its closed position;

determines at least one second value of the characteristic during operation of the valve, wherein the second value is determined based on at least one second progression of the measurement signal recorded when the valve is in an almost-closed position; and compares the second value with the first value; and generates a status signal to indicate that no leakage diagnosis is possible if the deviation of the second value from the first value does not exceed a predefined first threshold value.

Further, a diagnostic method for a valve that can be actuated by a positioner by way of a drive, wherein the valve has a sensor for detecting structure-borne noise and a device that receives from the sensor a measurement signal of the structure-borne noise, the method including:

determining a first value of a characteristic during a calibration process, wherein the first value is based on a first progression of the measurement signal recorded when the valve is in its closed position;

determining at least one second value of the characteristic during operation of the valve, wherein the second value is based on at least one second progression of the measurement signal recorded when the valve is in an almost-closed position;

comparing the first value with the second value; and generating a status signal indicating that no leakage diagnosis is possible if the deviation of the second value from the first value does not exceed a predefined first threshold value.

For reliably detecting leakage flows by measuring the acoustic emission, it is desirable to obtain a measurement signal corresponding to the basic noise of the valve in its closed position, and a measurement signal corresponding to the noise emission when the valve is open slightly. The basic noise is measured by closing the intact valve during a calibration process, so that no flow noise at all can occur. The causes for the basic noise are essentially the operating noise of the valve drive and the structure-borne noise of neighboring pumps in the process plant, which is transmitted over the pipes. A measurement signal that closely correlates with the structure-borne noise for a small leak in the valve is recorded by simulating the leak with a small valve gap. The invention is based on the recognition that a valve might be incorrectly evaluated as good, i.e., as free from leaks, if no suspicious noise occurs when the valve is in its closed position because the pressure drop over the valve, for example, is not sufficiently high. In this case, the diagnostic result that could at most be indicated, however, is that no diagnostic statement regarding leakage detection is currently possible on the basis of the structure-borne noise. To improve the reliability of diagnostic statements, the following boundary conditions should be included:

1) The valve must be closed for leakage detection by use of structure-borne noise,
2) the pressure in front of the valve,
3) the pressure behind the valve, and
4) the characteristics of the medium that influence the sound signal.

Alternatively, in principle, instead of 2) and 3) it is sufficient to know the pressure drop over the valve.

In addition, as described above, a diagnosis requires the basic noise of the closed valve under normal operating conditions, a leakage noise simulated by a small valve gap and the current noise for the closed position of the valve as in an installation under operating conditions. The basic noise is measured by closing the new intact valve in the process plant, such that no flow noise at all can occur. The leakage noise, like the simulated leakage noise, strongly depends on the boundary conditions 2) to 4). In principal, it would be possible to install pressure sensors in front of and behind the valve to measure the actual pressure in order to determine the boundary conditions 2) and 3). The dependence of the leakage noise on the boundary conditions 2) to 4) could be identified in a calibration process using a series of measurements under respectively different settings of the boundary conditions 2) to 4) for the individual measurements. Then, the measurements could be stored. However, to conduct the series of measurements, and install the pressure measuring devices to detect the corresponding operating conditions, would entail a significant amount of effort and cost.

The boundary condition 1) can be detected by a positioner, which is typically available. Alternatively, it is assumed that the boundary condition 1) is satisfied once a predefined time has elapsed after the closing of the valve.

The invention has an advantage in that during a calibration process only the basic noise for the closed position of the valve needs to be recorded and evaluated. A simulated leakage noise is not recorded during calibration but, instead, is recorded during operation, i.e., close to the time when the noise signal for the closed valve is recorded, which is evaluated to detect a leak. Due to the small time interval between the recording of the simulated leakage noise and the recording of the noise signal for the closed valve, it is possible to assume that the boundary conditions 2) to 4) are comparable during the two measurements. This increases the reliability of a diagnostic statement. In addition, the invention is advantageous because of its low complexity of the calibration process that is due to the fact that only the basic noise needs to be measured, and no measuring devices for detecting the boundary conditions are required.

The reliability of the diagnostic statement is further increased by the fact that a good/bad statement is output only if the simulated leakage noise is sufficiently different from the basic noise recorded during the calibration process. If there is not a sufficient difference, a status signal is generated to indicate that no leakage diagnosis is currently possible. A cause for the insufficient difference in noise values can be, for example, that the pressure drop across the valve is not sufficient to produce a clearly detectable flow noise when there is a leak. Thus, a diagnostic statement is made only if such a statement is possible in the corresponding operating phase based on appropriate boundary conditions. Further, a fault message signal is generated—to indicate a detected leakage flow—only if the measurement signal of the structure-borne noise recorded during operation of the installation with the valve in its closed position clearly differs from the noise recorded during calibration and tends toward the simulated-leakage noise. On the other hand, if the progression of the measurement signal recorded for the closed valve differs only slightly from the noise recorded during calibration, the system does not signal an error, or it indicates that there is no leakage through the valve.

The reliability of the diagnostic statement is advantageously further increased if, to record the simulated leakage noise, additional progressions of the measurement signal are recorded during a closing process and/or an opening process in different valve positions over a range near the closed position of the valve and are evaluated for the diagnosis. Traditionally, due to the tolerances of the valve and the drive and due to any soft seal that may be present in the valve, it is extremely difficult to produce a gap small enough to correspond to a small leak of the valve. This problem advantageously reduced by the measure described above. The valve positions over a range can be distinguished, for example, by subsequently dividing a measurement signal—recorded continuously during a closing or opening process—by time domains in an evaluation device. Alternatively, it is possible at predefined intervals to record a plurality of progressions of the measurement signal with short intervals each during a closing or opening process, at least some of which then represent measurement signal progressions that were recorded in different valve positions over a range near the closed position of the valve. These progressions then represent the simulated progressions for different leakage rates.

The reliability of the error statement can advantageously be further increased if among a plurality of characteristics that can be used to characterize the progression of the measurement signal, there is selected the characteristic in which the first value differs most clearly from the second value. Examples of such characteristics are the amplitude, the peak value, the effective value or the peak factor of the corresponding time characteristic. Additional examples are the amplitude in one or more frequency bands of the spectrum or the spectral power density. The peak factor is calculated as the ratio of the peak value to the effective value. The characteristic can of course also be determined by means of linking the above-described quantities or other suitable quantities, e.g., using fuzzy logic or a neural network.

The diagnostic system is preferably configured as an integral component of the positioner, such that the valve diagnosis can be initiated via the interface of the positioner and the result of the diagnosis can be output as a fault message signal in the form of a good/bad statement via this data interface. It is of course also possible to use indicator lamps, e.g., green for "no leak detected," yellow for "no leakage diagnosis possible" and red for "leakage flow detected" to indicate the result directly on the positioner.

BRIEF DESCRIPTION OF THE DRAWINGS

The invention and embodiments and advantages thereof will now be described in greater detail, by way of example, with reference to an embodiment depicted in the drawings, in which:

FIG. 2 shows examples of different noise spectra.

DETAILED DESCRIPTION OF THE PREFERRED EMBODIMENTS

Figure 1:
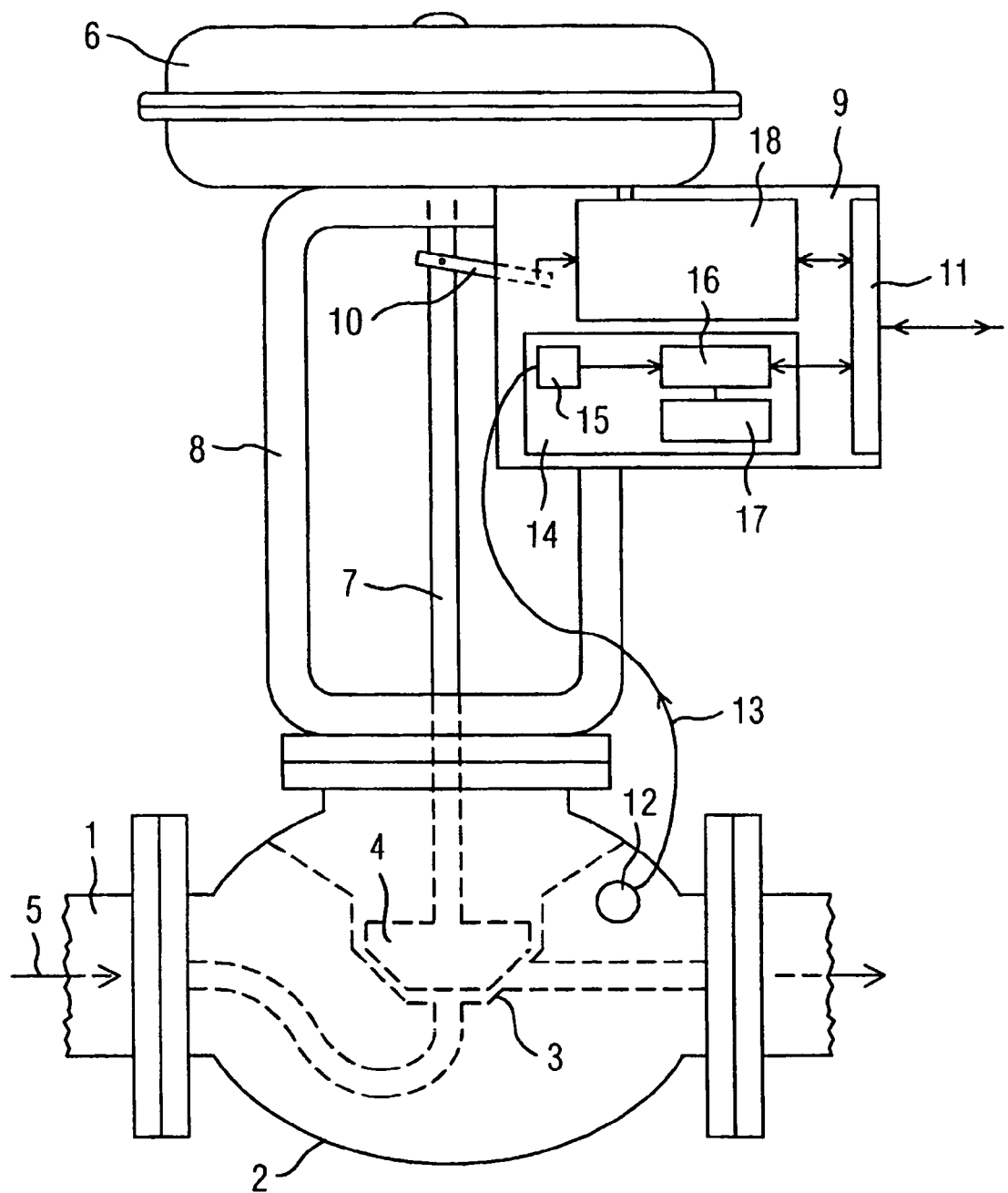
FIG. 1 shows the basic structure of a control valve with a diagnostic system.

According to FIG. 1, a valve 2 is installed in a pipeline 1 of a process plant (not depicted). The valve 2 controls the flow of a medium 5 by a corresponding stroke of a closing member 4 interacting with a valve seat 3. The stroke is produced by a drive 6, for example a pneumatic drive, and is transmitted to the closing member 4 via a valve rod 7. The drive 6 is connected to the valve housing via a yoke 8. A positioner 9 with a control unit 18 is mounted to the yoke 8. The positioner 9 detects the stroke on the input side by way of a connecting element 10 that engages with the valve rod 7, compares the stroke with a setpoint value supplied via a data interface 11 of a field bus, and controls the drive 6 on the output side in terms of a correction of the control deviation. A sensor 12 for structure-borne noise is mounted to the housing of the valve 2. A signal 13 from the sensor 12 is supplied as a measurement signal to a device 14 for evaluating the measurement signal 13. In the exemplary embodiment shown, the device 14 is part of the positioner 9. Alternatively, the device can be separate from the positioner 9. The device 14 contains a signal processing circuit 15 in which the measurement signal 13 is amplified, filtered and digitized so as to produce a conditioned signal. In a downstream arithmetic-logic unit 16, the frequency spectrum is additionally determined from the conditioned signal using a fast Fourier transform, for example. Depending on the requirements, the frequency spectrum may be stored in a memory 17 or further evaluated to obtain information on the state of the valve 2. The diagnosis of the valve is performed periodically or is initiated via the data interface 11, which is also used to request the result of the diagnosis.

As an alternative to the exemplary embodiment shown, individual evaluation functions may be shifted from the device 14 to a personal computer connected to the field bus. In this situation, data describing a digitized measurement signal or characteristics of the measurement signal may be transmitted to the personal computer via the data interface 11.

During a calibration process, the valve 2 is closed by the positioner 9. Once the valve is fully closed, a progression of the measurement signal 13 is recorded and is used to determine a first value w1 in the manner explained below with reference to FIG. 2.

In the diagram depicted in FIG. 2, the frequency is plotted on the abscissa and the amplitude of the spectral power density on the ordinate. FIG. 2 is only a qualitative representation, which omits scale indications. The value w1 in this case corresponds to the peak value of a spectral progression s1 of the power density of the basic noise in a frequency band between limiting frequencies A and B. This frequency band was calculated from the recorded progression of the measurement signal using a fast Fourier transform. Thus, in the exemplary embodiment shown, the peak value of the power density in a frequency band delimited by the frequencies A and B is used as the characteristic. The progression of the measurement signal recorded during the calibration process is stored so that—during subsequent operation—as an alternative to this characteristic, the values of other characteristics (with respect to which progressions recorded during operation differ more clearly from the progression recorded during calibration) can be determined and evaluated for further diagnosis. During subsequent operation of the valve, a plurality of progressions of the measurement signal is recorded during a preferably slow closing process and is stored. If this closing process is slow enough and if the measurements are taken sufficiently often, progressions can be recorded for very small valve openings. The stored progressions of the measurement signal are used to determine values of the characteristic for the different sections of the valve position range. In the exemplary embodiment shown, these values of the characteristic are the values of the peak value of the spectral power density in the frequency band between the limiting frequencies A and B. For a further evaluation for valve diagnosis, the value that differs most clearly from the first value is selected from among the additional values as the second value of the characteristic.

FIG. 2 shows the associated spectral progression s2 and the value w2 of the characteristic. The progression s2 represents the spectrum of a simulated leakage noise. If the second value w2 exceeds the first value w1 at least by, e.g., a factor of 1.5, it is determined that under the prevailing operating conditions a leakage detection of the valve is possible. If the deviation of the first value w1 from the second value w2 is less than half the value w1, the system would generate a status signal indicating that no leakage diagnosis is possible under the prevailing operating conditions. In the example described, a first threshold is therefore defined as half of the first value w1.

As an alternative to the above-described determination of the second value of the characteristic by using a plurality of additional values, the second value can be determined directly from a progression of the measurement signal, which was recorded directly for a valve position with a gap small enough to correspond to a small leak of the valve.

To define the point at which it should be concluded that a leak is present in the closed position of the valve, a second threshold value is determined as a function of the first value w1 and the second value w2. The valve is closed—during operation of the process plant—either because the process requires it or solely for diagnostic purposes. A third progression of the measurement signal with a spectral progression s3 of the power density is then recorded. A third value w3 of the characteristic is determined therefrom. If the deviation of the third value w3 from the first value w1 exceeds the second threshold value by, e.g., 0.2 times the first value w1, the presence of a leak is deduced in the example explained with reference to FIG. 2 and a fault signal is output via the data interface 11 (FIG. 1). This fault signal is processed in a higher-level process controller, e.g. to signal the need for maintenance.

As an alternative to the above-described exemplary embodiment, the device 14 can also be configured in such a way that the characteristic whose first value differs most clearly from at least one of the additional values is selected for diagnosis from among a predefined number of characteristics. Examples of characteristics are the amplitude, the peak value, the effective value or the peak factor of the progression of the measurement signal. Other examples are the power density, but in different frequency bands, or the amplitude of spectral signal components.

Another alternative is to record, during the calibration process, the progressions of the measurement signal in different sections of the valve position range during an opening process or during a combined closing and opening process. The sequence in which the second and third progression, and the additional progressions of the measurement signal, are recorded can be selected at will. The above-noted ordinals are simply used for the purposes of identification.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A diagnostic system for a valve actuated by a positioner by way of a drive, wherein the valve has a sensor for detecting structure-borne noise, the diagnostic system comprising:

a measurement signal evaluating device that receives from the sensor a measurement signal of the structure-borne noise, wherein the measurement signal evaluating device comprises an arithmetic logic unit that:
  determines a first value of a characteristic during a calibration process, wherein the first value is determined based on a first progression of the measurement signal recorded when the valve is in a closed position;
  determines at least one second value of the characteristic during operation of the valve, wherein the second value is determined based on at least one second progression of the measurement signal recorded when the valve is in an almost-closed position;
  compares the second value with the first value; and
  generates a status signal to indicate that no leakage diagnosis is possible if the deviation of the second value from the first value does not exceed a predefined first threshold value.

2. The diagnostic system as claimed in claim 1, wherein said arithmetic logic unit further determines additional values of the characteristic, wherein the additional values of the characteristic are determined based on additional progressions of the measurement signal that are recorded, respectively, at different valve positions in a range adjacent the closed position of the valve during a closing process or during an opening process, and further wherein the second value is determined as a function of the additional values.

3. The diagnostic system as claimed in claim 1, wherein said arithmetic logic unit further determines additional values of the characteristic, wherein the additional values of the characteristic are determined based on additional progressions of the measurement signal that are recorded, respectively, at different valve positions in a range adjacent the closed position of the valve during a closing process and during an opening process, and further wherein the second value is determined as a function of the additional values.

4. The diagnostic system as claimed in claim 1, wherein the arithmetic logic unit determines, out of at least two of the measurement-signal attributes of amplitude, peak value, effective value, peak factor or, in different frequency bands, power densities or amplitudes, the attribute in which the first value differs most from the second value, and selects that attribute as the characteristic.

5. The diagnostic system as claimed in claim 1, further wherein the arithmetic logic unit:
  determines a third value of the characteristic during operation of the valve, wherein the third value is determined based on a third progression of the measurement signal recorded when the valve is in the closed position;
  determines a second threshold value for an allowable deviation of the third value from the first value, wherein the second threshold is determined as a function of the first value and the second value;
  compares the third value with the first value; and
  generates a fault message signal if: the deviation of the second value from the first value exceeds the first threshold value; and the deviation of the third value from the first value exceeds the second threshold value.

6. The diagnostic system as claimed in claim 1 in combination with the valve.

7. A diagnostic system for a valve that can be actuated by a positioner via a drive, wherein the valve has a sensor for detecting structure-borne noise, the diagnostic system comprising:
  a measurement signal evaluating device that receives from the sensor a measurement signal of the structure-borne noise;
  means for determining, said means for determining being in communication with said measurement signal evaluating device, and wherein said means for determining:
    determines a first value of a characteristic during a calibration process, wherein the first value is determined based on a first progression of the measurement signal recorded when the valve is in a closed position;
    determines at least one second value of the characteristic during operation of the valve, wherein the second value is determined based on at least one second progression of the measurement signal recorded when the valve is in an almost-closed position; and
  said diagnostic system further comprising means for comparing the second value with the first value and for generating a status signal to indicate that no leakage diagnosis is possible if the deviation of the second value from the first value does not exceed a predefined first threshold value.

8. The diagnostic system as claimed in claim 7, wherein said means for determining determines additional values of the characteristic, wherein the additional values of the characteristic are determined based on additional progressions of the measurement signal that are recorded, respectively, at different valve positions in a range adjacent the closed position of the valve during a closing process or during an opening process, and further wherein the second value is determined as a function of the additional values.

9. The diagnostic system as claimed in claim 7, wherein said means for determining determines additional values of the characteristic, wherein the additional values of the characteristic are determined based on additional progressions of the measurement signal that are recorded, respectively, at different valve positions in a range adjacent the closed position of the valve during a closing process and during an opening process, and further wherein the second value is determined as a function of the additional values.

10. The diagnostic system as claimed in claim 7, wherein the means for determining determines, out of at least two of the measurement-signal attributes of amplitude, peak value, effective value, peak factor or, in different frequency bands, power densities or amplitudes, the attribute in which the first value differs most from the second value, and selects that attribute as the characteristic.

11. The diagnostic system as claimed in claim 7, wherein the means for determining:
  determines a third value of the characteristic during operation of the valve, wherein the third value is determined based on a third progression of the measurement signal recorded when the valve is in the closed position; and
  determines a second threshold value for an allowable deviation of the third value from the first value, wherein the second threshold is determined as a function of the first value and the second value, and
  the means for comparing and generating compares the third value with the first value and generates a fault message signal if: the deviation of the second value from the first value exceeds the first threshold value; and the deviation of the third value from the first value exceeds the second threshold value.

12. The diagnostic system as claimed in claim 7 in combination with the valve.

13. A diagnostic method for a valve actuated by a positioner via a drive, wherein the valve has a sensor for detecting structure-borne noise and a device that receives from the sensor a measurement signal of the structure-borne noise, the diagnostic method comprising:
- determining a first value of a characteristic during a calibration process, wherein the first value is based on a first progression of the measurement signal recorded when the valve is in a closed position;
- determining at least one second value of the characteristic during operation of the valve, wherein the second value is based on at least one second progression of the measurement signal recorded when the valve is in an almost-closed position;
- comparing the first value with the second value; and
- generating a status signal indicating that no leakage diagnosis is possible if the deviation of the second value from the first value does not exceed a predefined first threshold value.

14. The diagnostic method as claimed in claim 13, further comprising:
- determining a third value of the characteristic during operation of the valve, wherein the third value is based on a third progression of the measurement signal recorded when the valve is in the closed position;
- determining a second threshold value for an allowable deviation of the third value from the first value, wherein the second threshold is based on a function of the first value and the second value;
- comparing the third value with the first value; and
- generating a fault message signal if: the deviation of the second value from the first value exceeds the first threshold value; and the deviation of the third value from the first value exceeds the second threshold value.

* * * * *